United States Patent
Hinson

(10) Patent No.: US 7,614,494 B2
(45) Date of Patent: Nov. 10, 2009

(54) TROUGH ROLLER ASSEMBLY

(76) Inventor: Michael D. Hinson, 119 Gable Way, Madera, CA (US) 93637

( * ) Notice: Subject to any disclaimer, the term of this patent is extended or adjusted under 35 U.S.C. 154(b) by 96 days.

(21) Appl. No.: 11/449,377

(22) Filed: Jun. 8, 2006

(65) Prior Publication Data

US 2007/0284226 A1 Dec. 13, 2007

(51) Int. Cl.
B65G 15/08 (2006.01)
B65G 15/40 (2006.01)
(52) U.S. Cl. .................. 198/818; 198/820; 198/821; 198/822; 198/823
(58) Field of Classification Search ............ 198/818, 198/820–823; 384/477
See application file for complete search history.

(56) References Cited

U.S. PATENT DOCUMENTS

| | | |
|---|---|---|
| 3,105,588 A | 10/1963 | Long |
| 3,199,661 A | 8/1965 | Smith |
| 3,212,626 A | 10/1965 | McLeish et al. |
| 3,545,602 A | 12/1970 | McCullagh |
| 4,029,200 A | 6/1977 | Dillon |
| 4,032,002 A | 6/1977 | Jackson |
| 4,266,662 A | 5/1981 | Reid |
| 4,643,300 A * | 2/1987 | Morrison ................. 198/842 |
| 4,830,179 A | 5/1989 | Fyfe |
| 4,903,820 A | 2/1990 | Fyfe |
| 5,033,874 A * | 7/1991 | Rouse ................. 384/477 |
| 5,234,100 A * | 8/1993 | Cook ................. 198/842 |
| 5,373,935 A | 12/1994 | Anderson |
| 6,349,819 B1 * | 2/2002 | Nohl et al. ............. 198/830 |
| 6,550,606 B2 | 4/2003 | Tapp |
| 6,971,507 B2 * | 12/2005 | Forman ................. 198/805 |

* cited by examiner

*Primary Examiner*—Gene Crawford
*Assistant Examiner*—Leslie A Nicholson, III
(74) *Attorney, Agent, or Firm*—Richard A. Ryan

(57) ABSTRACT

An improved trough roller assembly for use in a continuous belt conveyor system comprises a pair of shafts disposed in a generally x-shaped configuration to support the moving belt in the upper flight section of the conveyor system and define the desired trough shape for carrying bulk materials thereon. The ends of the shafts, which are preferably made out of cold-rolled steel, rotatably connect to bearing assemblies that are cooperatively positioned on or in a pair of spaced apart support members that are mounted in a generally upright position on a frame member of the conveyor system. The bearing assemblies have a sealed bearing to reduce the likelihood of clogging or other damage from dust, bulk material or other debris that may be present. In an alternative embodiment, the support members are telescoping to allow the user to selectively change the trough shape.

17 Claims, 2 Drawing Sheets

TROUGH ROLLER ASSEMBLY

CROSS-REFERENCE TO RELATED APPLICATIONS

None.

BACKGROUND OF THE INVENTION

A. Field of the Invention

The field of the present invention relates generally to continuous belt systems configured for carrying bulk materials thereon. More particularly, the present invention relates to such continuous belt systems having a plurality of trough roller assemblies supporting the conveyor belt in a generally trough-like configuration. Even more particularly the present invention relates to a trough roller assembly having a pair of shafts defining the trough configuration.

B. Background

Continuous belt conveyor systems are commonly utilized to carry bulk materials, including trash, recyclables, gravel, coal, aggregate and many other types of materials, from one location to another, sometimes over long distances. One well known configuration for such conveyor systems has a continuous belt that comprises an upper flight section which carries the bulk materials to a location where it is dumped off the end of the conveyor belt for disposal or further processing and a lower flight section that returns the belt to a position where it can receive more bulk materials. A supporting framework supports roller assemblies, placed at appropriate intervals, over which the generally flexible belt travels in the upper and lower flight sections. To better maintain the bulk materials on the belt when traveling through the upper flight section, it is common to arrange the roller assemblies in the upper flight section in a generally trough or trough-like cross section that defines the belt in a corresponding configuration. These roller assemblies are commonly referred to as trough roller assemblies. The lower flight section is typically supported by roller assemblies comprising a single roller that supports the flexible belt in a generally flat or horizontal configuration. These roller assemblies are commonly referred to as return roller assemblies.

The present invention is directed to an improved trough roller assembly for carrying bulk materials. The prior art trough roller assemblies comprise a plurality of separate rollers that are cooperatively configured in the trough-like configuration. In a typical configuration, three rollers are utilized, one in the center that is positioned generally horizontal to define the bottom of the trough and one at each end or wing of the center roller that are angled in a generally upward direction to define the sides of the trough. Brackets mounted onto the framework separate the rollers and provide the desired trough-shaping angle for each roller. The rollers, commonly referenced as idler rollers, are rotatably attached to the brackets. In one common configuration, brackets support both ends of the idler rollers. Examples of this configuration are shown in U.S. Pat. No. 6,550,606 to Tapp, U.S. Pat. No. 6,349,819 to Nohl, U.S. Pat. No. 5,373,935 to Anderson, U.S. Pat. No. 4,029,200 to Dillon and U.S. Pat. No. 3,545,602 to McCullagh. These patents show the use of a pair of center brackets configured to rotatably support the center roller in a generally horizontal position and two pairs of side brackets that rotatably support the side or wing rollers in the angled position. In another configuration of three-roller trough roller assemblies, a single pair of support brackets rotatably support the center roller in a generally horizontal position and rotatably support, in a cantilever fashion, the side or wing rollers to define the trough. An example of this type of trough roller assembly is shown in U.S. Pat. No. 4,266,662 to Reid. In a two-roller configuration, a single bracket rotatably supports two rollers, both in an angled and cantilever fashion, to define a generally v-shaped trough. Examples of this type of trough roller assembly are shown in U.S. Pat. No. 4,903,820 to Fyfe, U.S. Pat. No. 4,830,179 to Fyfe and U.S. Pat. No. 4,032,002 to Jackson. In each of the above configurations, the flexible belt is configured to correspond to the trough cross-section defined by the rollers and slide over the rollers as it carries the bulk materials.

The presently available trough roller assemblies have some well known problems that the present invention overcomes. The primary problem, results from the fact that the existing roller assemblies utilize bearings that cannot be greased. Because the rotating ends of the rollers are exposed where they connect to the bearings and brackets, they are known to become clogged with debris, typically from the bulk materials being transferred over the upper flight section. As an example, in recycling operations where the conveying system is utilized to convey waste materials for further processing, it is well known that waste particles can clog the bearings. Problems with other materials are also well known. When the bearings become clogged, they freeze-up and stop rotating. When this happens the belt is then sliding over a stationary roller, which has a relatively thin metal shell that, over time, is gradually ablated away. If not fixed, the roller will form jagged edges that will cut into the conveyor belt. Avoiding clogging of the ends of the rollers require frequent maintenance in order to prevent damage to the rollers, belt and the belt system itself. Even with frequent maintenance these rollers typically require frequent replacement. In addition to the direct cost of purchasing new rollers and having personnel install the rollers, clogging of the rollers in the trough roller assembly can significantly impact the efficient operation of the belt system and, therefore, the use or processing of the materials carried in the upper flight section.

What is needed, therefore, is an improved configuration for a trough roller assembly that substantially reduces or eliminates debris clogging the rotating mechanism, a problem which is prevalent among presently available trough roller assemblies. The preferred trough roller assembly should substantially shield the rotating connections from being clogged with debris or other material so as to reduce the need for maintenance and/or replacement. The preferred trough roller assembly should comprise a minimum number of moving parts and be adaptable for a variety of different trough roller shapes and bulk materials. Preferably, the improved trough roller assembly will be adaptable to being manufactured out of materials and components that provide a lower cost trough roller assembly for use in various industrial and commercial enterprises.

SUMMARY OF THE INVENTION

The improved trough roller assembly of the present invention solves the problems and provides the benefits identified above. That is to say, the present invention discloses an improved trough roller assembly that substantially reduces or eliminates clogging of the rollers so as to reduce the need for maintenance and replacement, thereby reducing the cost of operating continuous belt conveyor systems and improving their operating efficiency. The trough roller assembly of the present invention has a minimum number of moving parts and utilizes materials and components which are generally readily available, providing a relatively cost effect continuous belt conveyor system. In addition, the trough roller assembly of the present invention is adaptable to being formed in a variety of trough shapes to carry a wide variety of bulk materials.

In one general aspect of the present invention, the trough roller assembly comprises a pair of elongated, rod-like shafts having ends that connect to sealed bearing assemblies mounted on or incorporated in a pair of spaced apart support members such that the shafts form an x-shaped configuration between the support members to support a continuous belt in a generally trough-like cross section in the upper flight section of a continuous belt conveyor system. More specifically, the trough roller assembly of the present invention has a first support member and a second support member mounted onto frame members so as to dispose the support members in spaced apart relation. The first end of the first shaft rotatably connects to an upper bearing assembly positioned at or near the upper end of the first support member. The second end of the first shaft rotatably connects to a lower bearing assembly positioned at or near the lower end of the second support member. The first end of the second shaft rotatably connects to a lower bearing assembly positioned at or near the lower end of the first support member. The second end of the second shaft rotatably connects to an upper bearing assembly positioned at or near the upper end of the second support member. As a result of the above, the first end of the first shaft is disposed above the first end of the second shaft on the first support member and the second end of the first shaft is disposed below the second end of the second shaft on the second shaft, thereby placing the two shafts in a generally x-shaped configuration between the support members. In the preferred embodiment, each of the bearing assemblies on the first and second support members has a sealed bearing disposed in a housing that is mounted to their respective support member. The x-shaped configuration of the shafts support the belt so as to define the desired trough or trough-like configuration to carry bulk materials. In a common embodiment, the lower ends of the support members are mounted on separate frame members of a frame assembly utilized to support the upper flight section of a continuous belt conveyor system. In an alternative embodiment, the support members are provided with a telescoping member configured with apertures that receive a locking pin to allow the user to selectively adjust the height of the support member, thereby disposing the upper end at a higher or lower position so as to change the configuration of the trough shape for the belt. One particular advantage of the present invention is that the x-shaped roller configuration allows the user to switch the rollers end-for-end to place the previously non-contacted lower sections of the rollers into contact with the conveyor belt, thereby doubling the life of the rollers. This, as well as other roller replacement, can be accomplished while the belt system is in use.

Accordingly, the primary objective of the present invention is to provide a trough roller assembly that provides the advantages discussed above and overcomes the disadvantages and limitations associated with presently available trough roller assemblies.

It is also an object of the present invention to provide an improved trough roller assembly for continuous conveyor belt systems that forms the flexible conveyor belt into a trough-like configuration so as to carry bulk materials thereon.

It is also an object of the present invention to provide an improved trough roller assembly for continuous conveyor belt systems that is configured so as to substantially reduce or eliminate debris clogging the rotatable connection of the trough roller assembly.

It is also an object of the present invention to provide an improved trough roller assembly for continuous conveyor belt systems that eliminates the center brackets used in the prior art to define the generally trough-shaped configuration.

It is also an object of the present invention to provide an improved trough roller assembly for continuous conveyor belt systems that utilizes a pair of shafts rotatably attached to sealed bearings mounted on support members to form a generally x-shaped configuration that defines the trough for carrying bulk materials.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures and drawings are merely illustrative of a preferred embodiment and represents one of several different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein are primarily directed to a trough roller assembly utilized in a continuous belt system having the return flight section disposed below the upper flight section, those skilled in the art will readily understand that this is shown merely for purposes of simplifying the present disclosure and that the present invention is not so limited.

Figure 1:
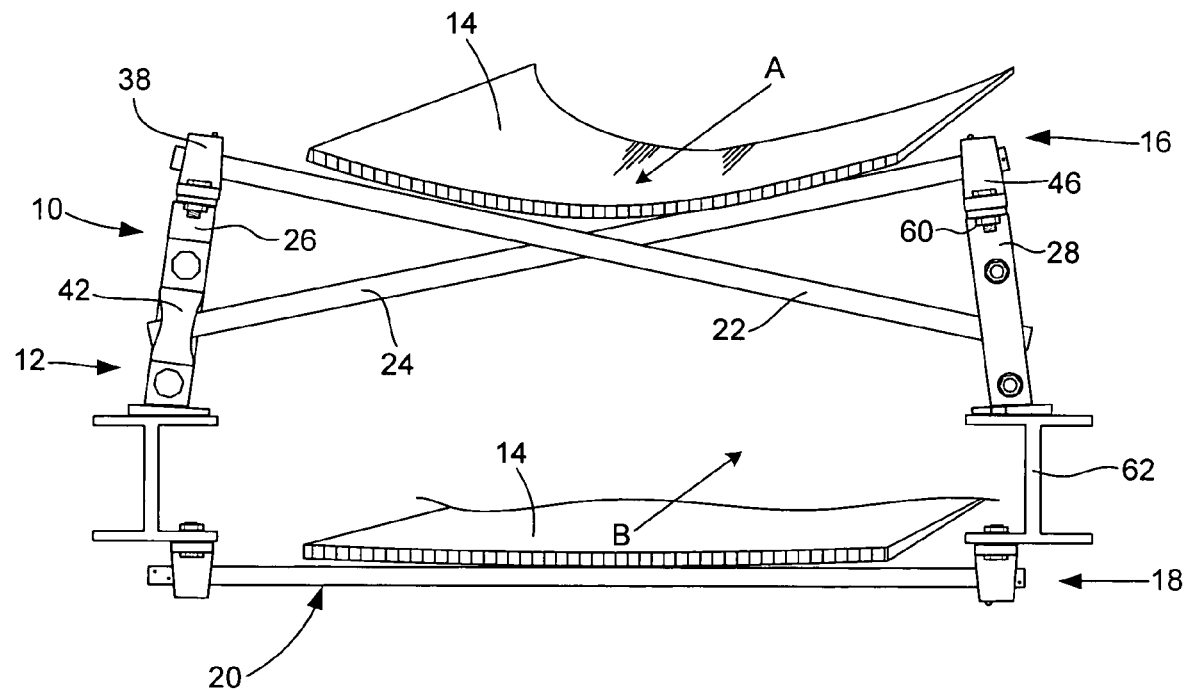
FIG. 1 is fragmentary front perspective view showing a continuous belt conveyor system having a trough roller assembly configured according to a preferred embodiment of the present invention for conveying bulk materials.
Figure 2:
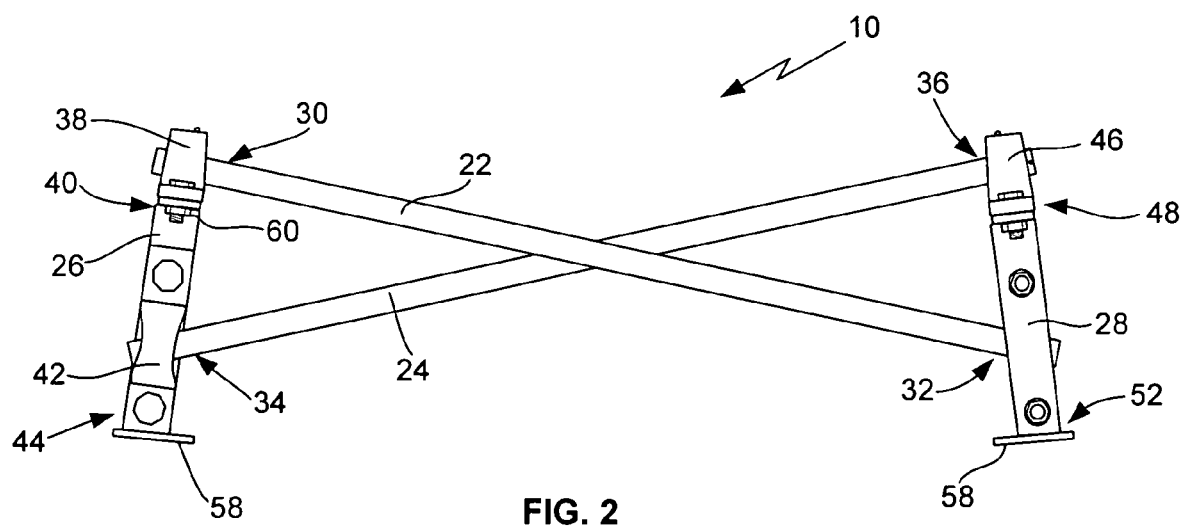
FIG. 2 is a front view of the trough roller assembly of FIG. 1 shown separate from the continuous belt conveyor system.

A trough roller assembly that is manufactured out of the components and configured pursuant to a preferred embodiment of the present invention is shown generally as 10 in FIGS. 1 and 2. Trough roller assembly 10 is preferably and beneficially utilized in a continuous belt conveyor system 12 having a continuous belt 14 moving in the direction indicated as A in the upper flight section 16 and moving in the direction indicated as B in the lower flight section 18. Upper flight section 16, in which belt 14 is formed in the preferred generally trough or trough-like cross-section, is utilized to carry bulk materials to a place for processing or disposal. Lower flight section 18 is utilized to return the belt 14 for receiving more bulk materials on belt 14. Trough roller assembly 10 is utilized to support belt 14 and define its trough shape in the upper flight section 16. A return roller assembly 20 is utilized to support belt 14 in the lower flight section 18, typically in a generally flat or horizontal configuration. Although the return roller assembly 20 shown in use with system 12 of FIG. 1 is a preferred configuration, which is the subject of a copending patent application by the same inventor as the present invention, the use of trough roller assembly 10 is not so limited. As will be readily apparent to those skilled in the art of continuous conveyor belt systems, various configurations of return roller assembly 20 are suitable for use with trough roller assembly 10 of the present invention.

Trough roller assembly 10 comprises a pair of elongated shafts, shown as first shaft 22 and second shaft 24, rotatably attached at their ends to first support member 26 and second support member 28, as shown in FIGS. 1 and 2. In the preferred embodiment, first shaft 22 is an elongated rod having a first end 30 and a second end 32 and second shaft 22 is a similarly configured elongated rod having a first end 34 and a second end 36. Preferably, both first shaft 22 and second shaft 24 are made from cold-rolled steel or like material that provides a substantially linear, solid metal rod with ends 30, 32, 34 and 36 which connect to bearings at first support member 26 and second support member 28. First support member 26 has an upper bearing assembly 38 that is positioned at or near its upper end 40 and a lower bearing assembly 42 that is positioned at or near its lower end 44. Second support member 28 has an upper bearing assembly 46 that is positioned at or near its upper end 48 and a lower bearing assembly 50 that is positioned at or near its lower end 52. Each of the bearing assemblies 38, 42, 46 and 50 have a bearing, shown as 54a, 54b, 54d and 54c, respectively (collectively the bearings are referenced herein as 54), in FIGS. 3 and 4, that are configured to receive the ends 30, 32, 34 and 36, as explained in more detail below, of first shaft 22 and second shaft 24.

In a preferred embodiment, support members 26 and 28 are tubular members that have an upper bracket 56 attached to the upper ends 40 and 48, respectively, thereof to which upper bearing assemblies 38 and 46 are attached. In a preferred embodiment upper bracket 56 is welded to the top of support members 26 and 28. In another embodiment, these components are integral. In the embodiment shown, a connecting element 60, such as the bolt and nut arrangement shown, is utilized to mount upper bearing assemblies 38 and 46 to upper brackets 56 and lower bearing assemblies 42 and 50 to the sidewall of support members 26 and 28. If desired, the bearing assemblies 38, 42, 46 and 50 can be attached by other mechanisms, including welding. A lower bracket 58 at the lower ends 44 and 52 of first 26 and second 28 support members, respectively, is utilized to secure first 26 and second 28 support members to frame member 62, which is a component of the frame assembly that supports the continuous belt conveyor system 12. First 26 and second 28 support members are placed in a generally upright position on frame member 60 such that the upper ends 40 and 48 are generally positioned above the lower ends 44 and 52. In one embodiment, lower bracket 58 includes a slot or like opening to receive a bolt or other connector (not shown) which connects to frame member 62 to secure first 26 and second 28 support members in place. Alternatively, lower bracket 58 may be joined to frame member 62 by welding or other connecting mechanisms appropriate for the respective materials and for the loads to be carried by belt 14.

Figure 3:
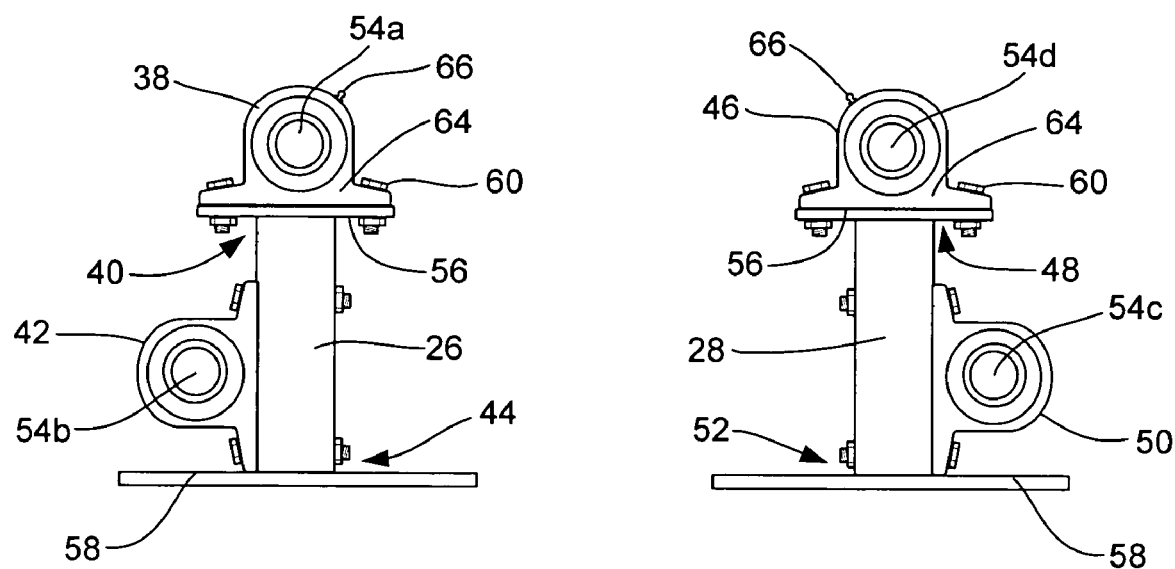
FIG. 3 is a side view of a support member utilized in the trough roller assembly of the present invention of FIG. 1 showing the use of the bearing mount housings and bearings.
Figure 4:
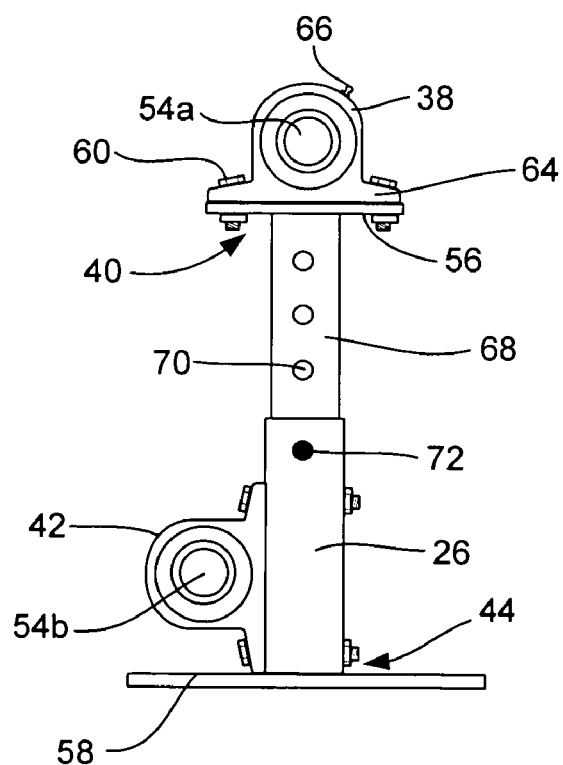
FIG. 4 is a side view of an alternative embodiment of the support member bracket of FIG. 3 showing the use of telescoping members to change the shape of the trough.

In the preferred embodiment, bearing assemblies 38, 42, 46 and 50 are sealed bearing units having bearing 54 mounted in a cast iron bearing housing 64, as shown in FIGS. 3 and 4, that is configured to allow the bearing 54 to slip (i.e., be self-centering) within housing 64 to compensate for any non-linear alignment of shafts 22 and 24. The housing 64 shown is commonly referred to as a pedestal or pillow block unit. As well known in the art, sealed bearing units are generally available as an off-the-shelf component, thereby reducing the cost of manufacturing trough roller assembly 10 of the present invention. Such bearing units are generally provided with a insert member that is configured to be tubular so as to receive an end of a rod, such as shafts 22 and 24, therein in a general "slip fit" arrangement. Once an end, such as ends 30, 32, 34 or 36, is received in the insert member, set screws are typically utilized to securely connect the insert member, and therefore the bearing 54, to the shaft 22 or 24. Allowing for bearing 54 to slip within housing 64 compensates for any original misalignment or misalignment that occurs as a result of shaft deflection, which can result from higher loads, so as to reduce the stress on the bearing raceways and balls (which could shorten the life of bearing 54). By being sealed, the likelihood of damage or shortened bearing life from debris, such as crushed glass particles or the like, clogging bearing 54 is significantly reduced or eliminated. In addition, frequency of maintenance to remove any debris from around bearing 54 is also reduced. If it does become necessary to replace a bearing assembly due to damage or wear, the user merely has to disconnect connecting element 60, disengage the end of the appropriate shaft and then replace the damaged or worn bearing assembly with a new bearing assembly. If desired, bearing assemblies 38, 42, 46 and 50 can be of the relubrication type that has a grease hole in the bearing's outer ring (not shown), a circumferential groove in the bore of the housing 64 and a grease fitting, shown as 66 in FIGS. 3 and 4, on the housing 64 to allow for regreasing bearing 54. Although bearings 54 are in housings 64 shown mounted on the outside of support members 26 and 28, those skilled in the art will understand that bearings 54 can be incorporated directly into the body of support members 26 and 28.

As best shown in FIGS. 1 and 2, first shaft 22 and second shaft 24 are disposed in a generally x-shaped configuration so as to support the belt 14 in the user's desired trough shape (as shown). As will be readily apparent to those skilled in the art, the relative configuration of first shaft 22, second shaft 24, first support member 26 and second support member 28 will define the resulting trough shape. The trough shape is achieved by the cooperative positioning of upper bearing assemblies 38 and 46 and lower bearing assemblies 42 and 50 and rotatably attaching the first end 34 of second shaft 24 below the rotatable attachment of first end 30 of first shaft 22 and rotatably attaching the second end 36 of first shaft 22 below the rotatable attachment of second end 36 of second shaft 24. In the embodiment shown, first end 30 of first shaft 22 connects to first bearing 54a to rotate in upper bearing assembly 38 at or near the upper end 40 of first support member 26, first end 34 of second shaft 24 connects to second bearing 54b to rotate in lower bearing assembly 42 at or near the lower end 44 of first support member 26, second end 32 of first shaft 22 connects to third bearing 45c to rotate in lower bearing assembly 50 at or near the lower end 52 of second support member 28 and second end 36 of second shaft 24 connects to fourth bearing 54d to rotate in upper bearing assembly 46 at or near the upper end 48 of second support member 28. The flexible belt 14 will move against the upper sections of first shaft 22 and second shaft 24 to define the trough shape desired to transport bulk materials so as to prevent these materials from readily falling off of the upper flight section 16.

As stated above, in the preferred embodiment first shaft 22 and second shaft 24 are substantially linear, solid members manufactured from cold-rolled steel, thereby avoiding problems known to exist with use of tubular rollers and providing a generally lower cost trough roller assembly 10. The use of off-the-shelf sealed bearing assemblies 38, 42, 46 and 50 further reduce the cost of trough roller assembly 10. In addition, because the bearings 54 are sealed, there is significantly less likelihood of damaging bearings 54 from debris that falls off of belt 14 or which is otherwise in the area (i.e., dust) of continuous belt conveyor system 12. This substantially reduces the cost and downtime required for maintenance of trough roller assembly 10 relative to existing assemblies. If it does become necessary to replace a bearing 54, many of the available bearing assemblies are configured to relatively easily remove bearing 54 by popping it off of housing 64.

Another primary advantage of the trough roller assembly 10 of the present invention is that the x-shaped configuration of shafts 22 and 24 allows the user to switch shafts 22 and 24 end-for-end to double their operating life. As best shown in FIGS. 1 and 2, belt 14 only contacts the upper sections of shafts 22 and 24 during use of system 12, the lower sections thereof being below the where the belt 14 contacts the x-shaped configuration. As the shafts 22 and 24 begin to wear, the user can switch their ends, such as placing first end 30 at lower bearing assembly 48 and second end 32 at upper bearing assembly 40 for first shaft 22 and placing first end 34 at upper bearing 46 and second end 36 at lower bearing 42 for second shaft 24. As will be readily understood by those skilled in the art, this doubles the life of shafts 22 and 24 with very little cost to the user, basically just labor, for this benefit. The switching of the ends of shafts 22 and 24 to double the life of shafts 22 and 24 can be accomplished without shutting down the continuous belt conveyor system 12.

An alternative embodiment for first support member 26 is shown in FIG. 4, which is equally applicable to second support member 28. In this embodiment, first support member 26 is tubular and configured to receive a telescoping member 68 having one or more apertures 70 and a locking pin 72 for selectively adjusting the height of upper end 40 and, as a result, upper bearing assembly 38. Changing the height of upper bearing assembly 38, which will generally be done in a corresponding manner for second support member 28 and upper bearing assembly 46, changes the trough shape defined by first shaft 22 and second shaft 24 to provide a more or less V or bowl shaped trough for carrying bulk materials. To provide the ability to utilize the same trough roller assembly 10 with different shaped troughs, it will likely be necessary to provide first shaft 22 and second shaft 24 of sufficient length to allow telescoping member 68 to be raised and still maintain first 30 and second 32 ends of first shaft 22 and first 34 and second 36 ends of second shaft 24 in their respective bearing assemblies (as discussed above).

In use, the lower end 44 of first support member 26 and the lower end 52 of second support member 28 are mounted, generally either with bolts, screws or other connectors or by welding, to the top side of frame member 62. With upper 38 and lower 42 bearing assemblies mounted to or incorporated in first support member 26 and upper 46 and lower 50 bearing assemblies mounted to or incorporated in second support member 28, the ends of shafts 22 and 24 are placed through the appropriate bearings 54 to form an x-shaped configuration for trough roller assembly 10, as shown in FIGS. 1 and 2, and connected thereto by securing the insert member to the ends of shaft 22 or 24. Belt 14 is guided over the top side of the x-shape formed by first 22 and second 24 shafts to define the desired trough shaped configuration. The relative flatness or v-shape of the trough is controlled by the relative placement of the ends of shafts 22 and 24 at first 26 and second 28 support members. In an alternative embodiment, support members 26 and 28 are provided with telescoping member 68 that is slidably received inside the tubular shaped support members 26 and 28 and fixed at a desired height, thereby fixing the trough shape of belt 14, by placement of a pin or the like through one of the one or more apertures 70 on telescoping member 68. Once in place, belt 14 is operated as normal. The resulting x-shaped configuration of belt 14 in the upper flight section 16 will provide a trough shape for carrying bulk materials thereon in a manner that reduces the loss of materials from belt 14.

While there are shown and described herein a specific form of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape, and use. For instance, there are numerous components described herein that can be replaced with equivalent functioning components to accomplish the objectives of the present invention.

What is claimed is:

1. A trough roller assembly configured to support a belt in a trough shape, said trough roller assembly comprising:
    a first support member having an upper end and a lower end;
    a second support member having an upper end and a lower end, said second support member in spaced apart relation to said first support member, wherein said lower end of said first support member and said lower end of said second support member mount to one or more frame members;
    an elongated first shaft having a first end and a second end; and
    an elongated second shaft having a first end and a second end, said first end of said first shaft rotatably connected to said first support member, said first end of said second shaft rotatably connected to said first support member below said first end of said first shaft, said second end of said first shaft rotatably connected to said second support member, said second end of said second shaft rotatably connected to said second support member above said second end of said first shaft, wherein said first shaft and said second shaft are disposed in a generally x-shaped configuration so as to define said trough shape.

2. The trough roller assembly according to claim 1, wherein said first end of said first shaft connects to an upper bearing assembly mounted to said first support member, said first end of said second shaft connects to a lower bearing assembly mounted to said first support member, said second end of said first shaft connects to a lower bearing assembly mounted to said second support member and said second end of said second shaft connects to an upper bearing assembly mounted to said second support member.

3. The trough roller assembly according to claim 2, wherein each of said bearing assemblies comprise a bearing sealably disposed in a bearing housing.

4. The trough roller assembly according to claim 3, wherein said bearing and said bearing housing are cooperatively configured to allow said bearing to slip so as to be generally self-centering.

5. The trough roller assembly according to claim 1, wherein said first end of said first shaft connects to a first bearing at said first support member, said first end of said second shaft connects to a second bearing at said first support member, said second end of said first shaft connects to a third bearing at said second support member and said second end of said second shaft connects to a fourth bearing at said second support member.

6. The trough roller assembly according to claim 5, wherein each of said first bearing, said second bearing, said third bearing and said fourth bearing are sealably disposed in a housing.

7. The trough roller assembly according to claim 1, wherein at least one of said first support member and said second support member further comprise a telescoping member having one or more apertures, said telescoping member configured to selectively vary the height of said upper end of said at least one of said first support member and said second support member to change said trough shape.

8. The trough roller assembly according to claim 1, wherein each of said first shaft and said second shaft are solid metal rods.

9. A trough roller assembly configured to support a belt in a trough shape, said trough roller assembly comprising:
   a generally upright first support member having an upper bearing assembly towards an upper end and a lower bearing assembly towards a lower end;
   a generally upright second support member having an upper bearing assembly towards an upper end and a lower bearing assembly towards a lower end, said second support member in spaced apart relation to said first support member, wherein said lower end of said first support member and said lower end of said second support member mount to one or more frame members;
   an elongated first shaft having a first end and a second end, said first end rotatably received in said upper bearing assembly of said first support member, said second end rotatably received in said lower bearing assembly of said second support member; and
   an elongated second shaft having a first end and a second end, said first end rotatably received in said lower bearing assembly of said first support member, said second end rotatably received in said upper bearing assembly of said second support member, wherein said first shaft and said second shaft are disposed in a generally x-shaped configuration so as to define said trough shape.

10. The trough roller assembly according to claim 9, wherein each of said bearing assemblies comprise a bearing sealably disposed in a bearing housing.

11. The trough roller assembly according to claim 10, wherein said bearing and said bearing housing are cooperatively configured to allow said bearing to slip so as to be generally self-centering.

12. The trough roller assembly according to claim 9, wherein at least one of said first support member and said second support member further comprise a telescoping member having one or more apertures, said telescoping member configured to vary the height of said upper end of said at least one of said first support member and said second support member to change said trough shape.

13. The trough roller assembly according to claim 9, wherein each of said first shaft and said second shaft are solid metal rods.

14. A trough roller assembly configured to support a belt in a trough shape, said trough roller assembly comprising:
   a generally upright first support member having an upper bearing assembly towards an upper end and a lower bearing assembly towards a lower end, said upper bearing assembly having a first bearing sealably disposed in a housing, said lower bearing assembly having a second bearing sealably disposed in a housing, said lower end mounted to a first frame member;
   a generally upright second support member having an upper bearing assembly towards an upper end and a lower bearing assembly towards a lower end, said lower bearing assembly having a third bearing sealably disposed in a housing, said upper bearing assembly having a fourth bearing sealably disposed in a housing, said lower end mounted to a second frame member so as to dispose said second support member in spaced apart relation to said first support member;
   an elongated first shaft having a first end connected to said first bearing and a second end connected to said third bearing; and
   an elongated second shaft having a first end connected to said second bearing and a second end connected to said fourth bearing, wherein said first shaft and said second shaft are disposed in a generally x-shaped configuration so as to define said trough shape.

15. The trough roller assembly according to claim 14, wherein each of said first bearing, said second bearing, said third bearing and said fourth bearing are configured to be generally self-centering.

16. The trough roller assembly according to claim 14, wherein at least one of said first support member and said second support member further comprise a telescoping member having one or more apertures, said telescoping member configured to vary the height of said upper end of said at least one of said first support member and said second support member to change said trough shape.

17. The trough roller assembly according to claim 14, wherein each of said first shaft and said second shaft are solid metal rods.

* * * * *